H. D. MORTON.
AUTOMATIC ARC WELDING MACHINE.
APPLICATION FILED MAR. 2, 1917. RENEWED NOV. 10, 1917.

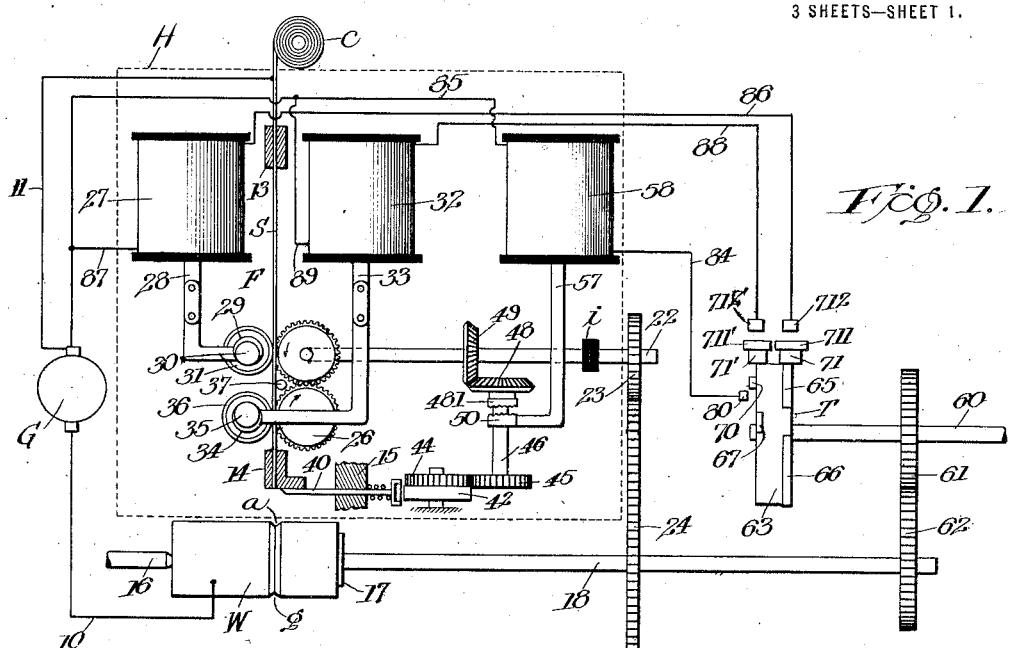

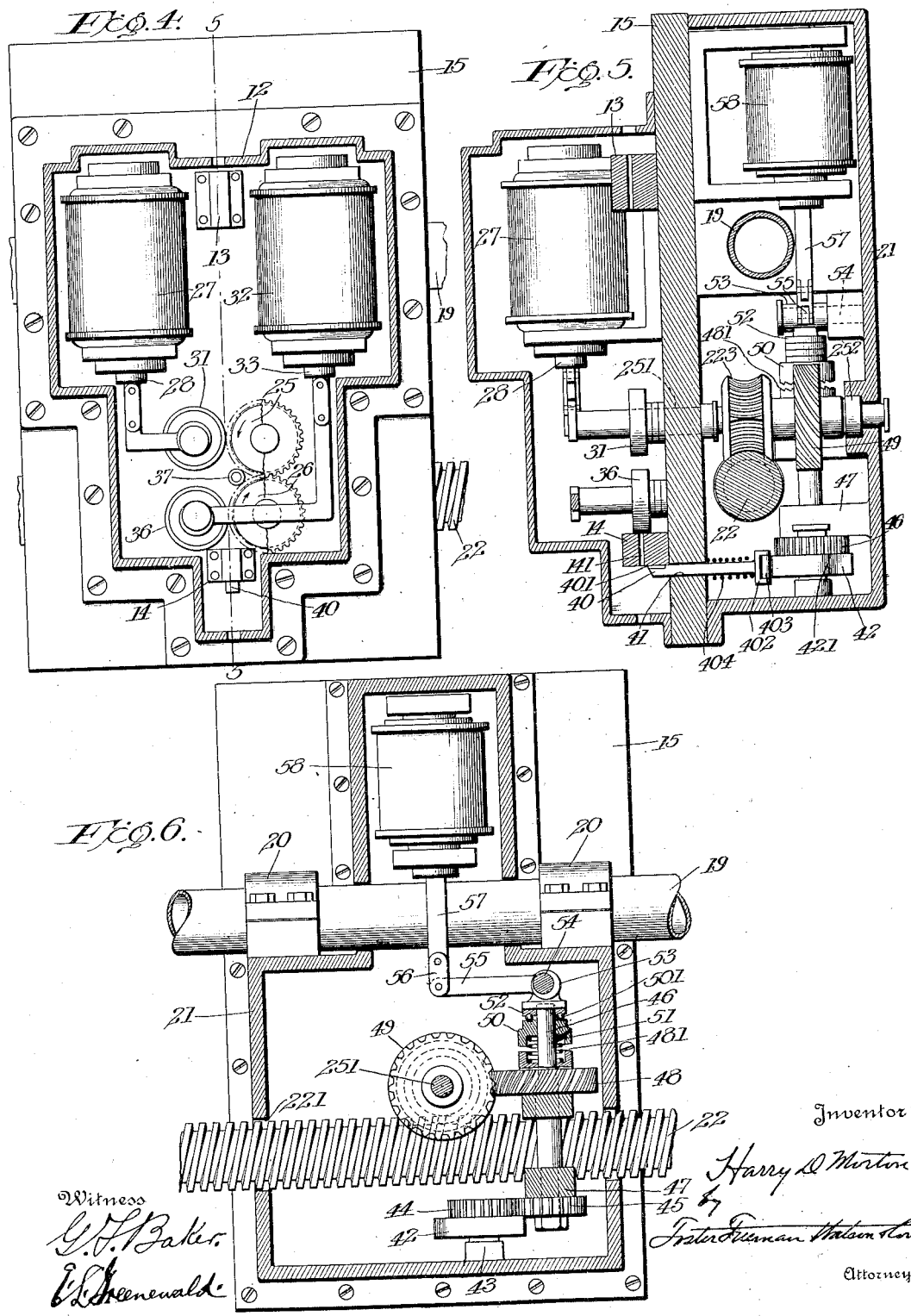

1,278,983.

Patented Sept. 17, 1918.
3 SHEETS—SHEET 3.

Witness
G. F. Baker.
E. L. Greenewald.

Inventor
Harry D. Morton
By Foster Freeman Watson & Coit
Attorney

UNITED STATES PATENT OFFICE.

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

AUTOMATIC ARC-WELDING MACHINE.

1,278,983.  Specification of Letters Patent.  Patented Sept. 17, 1918.

Application filed March 2, 1917, Serial No. 152,117. Renewed November 10, 1917. Serial No. 201,407.

*To all whom it may concern:*

Be it known that I, HARRY D. MORTON, a citizen of the United States, residing at Detroit, Wayne county, State of Michigan, have invented certain new and useful Improvements in Automatic Arc-Welding Machines, of which the following is a specification.

My invention relates to means for automatically feeding a welding strip or welding wire into and away from the arc of an automatic metallic electrode electric arc welding machine and has for its objects the providing of simple and effective means for insuring that said welding strip or welding wire, which constitutes one electrode, shall always travel a definite and predetermined distance to make a contact with the work, constituting the other electrode, in order to start the flow of current; that it shall be drawn away from the said work a definite and predetermined distance in order to form the arc; that it shall feed to said arc continually during the welding operation, in order to perform the two functions of maintaining the arc and of supplying welding material for fusing by the arc and for depositing upon the work; that it shall, when the weld is completed, again draw away from the work, causing the arc to rupture; that it shall thereafter travel in said reverse direction a definite and predetermined distance; and that the end of the said welding strip or welding wire which has been subjected to the action of the arc shall thereafter be automatically cut off at a definite and predetermined distance from the work in order that for the next succeeding weld a clean end of the welding strip or welding wire will be available.

Figures 7, 8:
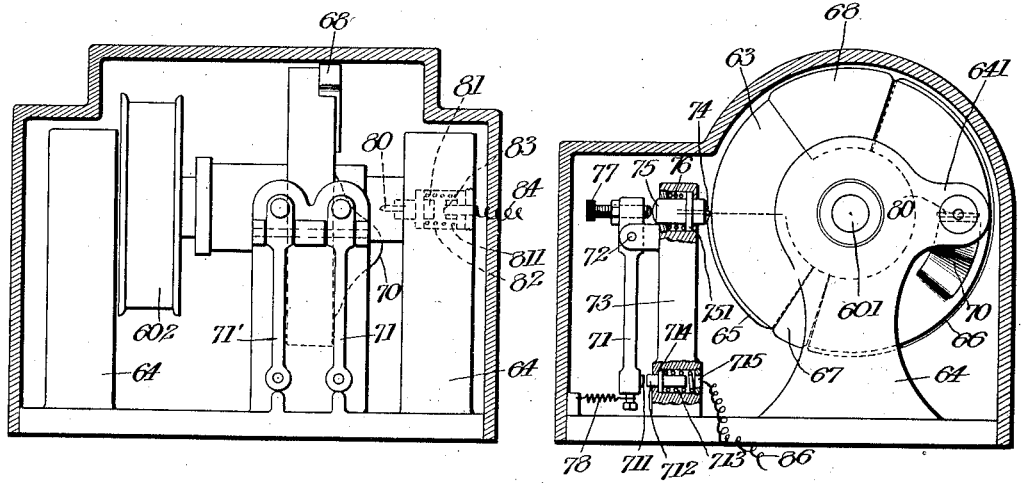
Figures 9, 10:
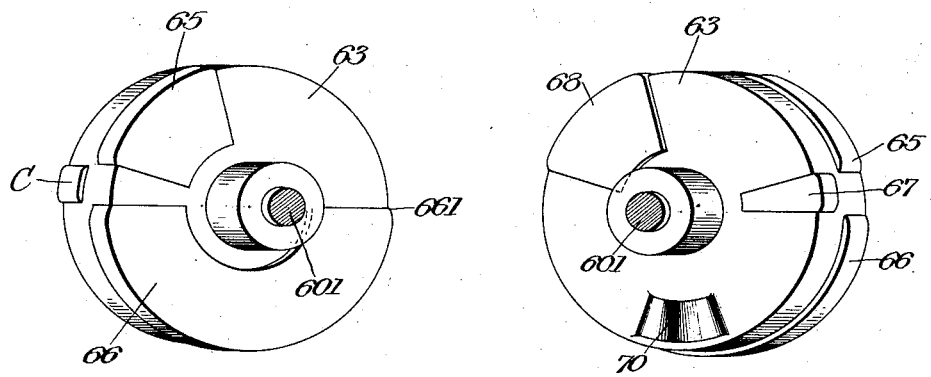

The above and other objects and the novel features of my invention will be apparent from the following description taken in connection with the drawing in which, Figure 1 is a diagram representing a metallic electrode electric arc welding machine embodying my invention, Fig. 2 is a front view and Fig. 3 is a side view of a welding head embodying my invention, Fig. 4 is a front view of the welding head with a cover thereof removed to disclose the welding strip feeding mechanism on the interior, Fig. 5 is a vertical cross sectional view of the welding head taken on the line 5—5 of Fig. 4, Fig. 6 is a rear view of the welding head, a cover thereof being removed to disclose the cutter operating mechanism and the driving means for the feeding mechanism and cutter operating mechanism, Figs. 7 and 8 are side and end views of a timer and circuit controlling device, and Figs. 9 and 10 are perspective views of opposite sides of a timer disk by means of which the feeding mechanism and cutting mechanism are controlled.

While I have shown the features of my invention as applied to a metallic electrode electric arc welding machine in which the work constitutes one of the electrodes and a metallic welding strip in the form of a wire constitutes the other electrode, it is to be understood that certain of the principles and features of my invention are not limited to the specific type of machine here disclosed but are of broader application.

Referring to Fig. 1, G represents a generator or other suitable source of current for supplying suitable welding current to the welding circuit which includes the wires 10 and 11. The wire 10 is electrically connected to the work W and the wire 11 may be directly connected to the wire S. The work W and the welding strip or wire S constitute the two electrodes between which the arc is drawn or formed at $a$, the work being shown as provided with a groove $g$ at the joint between two pieces of metal. When the arc is drawn at $a$ the groove $g$ is filled with welding material supplied by the strip S and deposited on the work W while the latter is being rotated to successively bring all parts of the annular groove $g$ opposite the end of the welding strip S. The welding strip S consists of iron or other metal wire of a suitable composition which may be automatically and uninterruptedly supplied from a coil $c$ to the work W by an automatic feeding mechanism designated generally by F.

The feeding mechanism F is carried within a casing 12 which constitutes part of a welding head H. In the diagram of Fig. 1 the welding head H is indicated diagrammatically by a dotted line inclosing diagrammatic representations of mechanisms carried by it. The welding strip S is fed through suitable upper and lower guides 13 and 14 within the casing 12 and mounted on the front face of a panel 15 constituting a part of the welding head H. While the molten metal supplied by the welding strip S is deposited in the groove $g$ in the work W, the latter is being rotated about its axis, the work being supported for rotation by a point 16 and a chuck 17 carried by the rotatable shaft 18. It will be understood that the welding head H remains stationary while the work W is being rotated but this condition may be reversed in some classes of work and the work kept stationary while the welding head is moved along the part of the work to be welded. In other classes of work the work W may be reciprocated instead of rotated or rotated about a vertical axis instead of a horizontal axis.

The welding head H is carried by a tube 19 which extends through clamps 20 secured to the rear side of the panel 15. The ends of the tube 19 are supported in stanchions (not shown). The tube extends through a casing 21 on the rear side of the panel 15 in which the cutter operating and controlling mechanism is located. A screw shaft 22 for driving the welding strip feed mechanism and the cutting mechanism passes through openings 221 in the casing 21 and is supported at its ends by stanchions (not shown) and is continuously rotated by suitable gearing, such as the gears 23 and 24, which connect this shaft to the shaft 18 which rotates the work W. In this manner the shafts 18 and 22 are driven at a fixed speed ratio to each other. An insulating coupling $i$ which connects two parts of the shaft 22 insulates the feeding and cutting mechanism from the work.

The feeding mechanism F includes a direct feed roll 25 and a reverse feed roll 26, both of which preferably have serrated faces to grip the welding strip S and are geared together, as shown. These rolls are continuously driven in opposite directions, as indicated, by a shaft 251 which carries the feed roll 25 (see Fig. 5). The shaft 251 extends through a bearing in the panel 15 from the front face to the rear side thereof and its rear end is mounted in a bearing 252 in the casing 21. The shaft 251 carries a worm gear 223 which meshes with the worm shaft 22 and consequently the feed rolls 25 and 26 are continuously but indirectly driven by the shaft 22 when the latter is rotating. The direct feed roll 22 is brought into action to feed the welding strip S to the work by means of a direct feed roll solenoid 27 mounted in the casing 12. The plunger 28 of this solenoid is connected to an eccentric sleeve 29 carried by the fixed pivot 30 on the front of the panel 15. The eccentric 29 carries an idler roll 31 having a serrated face and when the solenoid 27 is energized it will cause the idler roll 31 to force the welding strip S toward the right in Fig. 1 and against the feed roll 25 which is rotating in the direction indicated by the arrow. The strip S will be gripped between the idler roll 31 and feed roll 25 and fed toward the work.

The reverse feed roll 26 is rendered operative to feed the welding strip S away from the work when the reverse feed solenoid 32 is energized. This solenoid is provided with a plunger 33 which is connected by a suitable arm to an eccentric bushing 34 on the fixed stud 35. The eccentric bushing 34 carries an idler roll 36, the face of which is serrated, and which is directly opposite the reverse feed roll 26 and when the solenoid 32 is energized the idler roll 36 will force the welding strip S against the roll 26 and the welding strip will be gripped and fed away from the work W to draw the arc to start the welding operation or to rupture the arc when the welding operation is completed.

Since the feed rolls 25 and 26 rotate continuously even when the solenoids 27 and 32 are deënergized there may be a tendency for the welding strip S to creep in one direction or the other or to wear unless it is held away from the faces of the feed roll. For this purpose I provide a small idler roll 37, the outer side of which is disposed to the left of a line tangent to the faces of the feed rolls 25 and 26. This will normally keep the welding strip S out of contact with the feed rolls 25 and 26 but the instant either of the solenoids 27 or 32 is energized the welding strip S will be forced against that particular feed roll which is to operate on the welding strip. The idler roll 37 therefore does not interfere with the feeding of the welding strip toward or away from the work.

I have found that after completing the weld on an article and after rupturing the arc, a small globule of molten metal usually adheres to the end of the welding strip. This globule is of indefinite length and unless the welding strip is cut off a fixed distance from the work each time a weld is completed, the machine will not close the welding circuit at the same instant for each succeeding welding operation. For this reason it is particularly important in an automatic welding machine to cut off the end of the welding strip at a fixed distance from the work after each weld is completed. The casing 21 incloses a mechanism by means of which the end of the welding strip is automatically cut off after each weld is completed. This cutting mechanism includes a cutter 40 which passes through and is guided by an opening 41 in the panel 15. The cutting edge 401 moves along the lower face of the lower welding strip guide 14 and across the lower end of the opening 141 therein. Since the welding head H is rigidly mounted at a fixed distance from the particular work W being welded the lower face of the guide 14 will be a fixed distance from the work and when the cutter moves across the opening 141 the welding strip projecting below the lower end of this opening will be sheared off after each weld. The cutter 40 is provided with a head 402 which carries a roller 403 and also provides a shoulder against which the retracting spring 404 bears. The other end of the retracting spring bears against the rear face of the panel 15 so that normally the cutting edge 401 is held to the right-hand side of the opening 141.

The cutter 40 is operated by means of a cam 42 which has a high point 421. The roller 403 is held against the face of the cam 42 by the spring 404 and when the high part 421 of the cam engages the roller 403 the cutting point 401 of the cutter is forced to cross the lower end of the opening 141 and the end of the welding strip is severed. The cam 42 is rotatably supported in a bearing 43 in the casing 21 and upon its upper side carries a gear 44 rigidly connected to it. The gear 44 meshes with the gear 45 carried on the lower end of a vertical shaft 46 which is mounted in suitable bearings 47 on the casing 21. A spiral gear 48 carries an annular ball bearing (not shown) and normally runs idly around the shaft 46. The spiral gear 48 meshes with a corresponding spiral gear 49 keyed to the shaft 251 upon which the feed roll 25 is mounted. The spiral gear 48 has a hub portion 481 provided with teeth forming one half of a clutch. The member 50 constitutes the other and co-acting half of the clutch and is provided with teeth coöperating with the toothed hub portion 481 and is also keyed to and slidable along the shaft 46. The two halves of the clutch are normally held apart and out of engagement by a spring 51. Above the clutch member 50 there is a ball thrust bearing 501 resting upon which is a member 52 forming a seat for an eccentric 53 carried by the shaft 54. The eccentric 53 is provided with a lever 55 which is connected by a link 56 to the plunger 57 of a solenoid 58, the frame of which is attached to the panel 15.

The operation of the cutting mechanism therefore depends upon the closing of the circuit of the solenoid 58. The attraction of the plunger 57 raises the lever 55 and turns the eccentric 53 on its shaft, forcing the member 52, ball thrust bearing 501 and clutch member 50 downward and causing the latter to engage with the clutch teeth on the hub portion 481 on the spiral gear 48. The clutch member 50 being keyed to the shaft 46, the constantly rotating spiral gear 48 is thus made to drive said shaft, bringing the high part of the cam 42 into contact with the roll cutter 40 and forcing said cutter to the left in Figs. 1 and 5, across the opening 141 of the guide 14. As the cam 42 revolves, the blade of the cutter 40 is slowly forced against the wire, cutting the latter at a definite point and assuring that the wire will feed exactly the right distance downward for the next succeeding weld. When the wire has been clipped, the cutter 42 is restored by the spring 404 to its original position. The wire is thus free to feed downward at the next weld.

The times at which the solenoid 27, 32 and 58 are rendered operative and inoperative are determined by a timer device T fixed on or driven by the driving shaft 60, which is geared to the shaft 18 by the gears 61 and 62. The timer device T is shown diagrammatically in Fig. 1 and its actual construction is shown in Figs. 7 to 10. Referring to Figs. 7 to 10, the timer device comprises a disk member 63 supported in the stanchions 64 by a shaft 601 which is adapted to be connected to the shaft 60 by a wheel 602 and a suitable chain or belt, not shown.

Figs. 9 and 10 show the construction of the disk 63 which determines the time at which the solenoids 27, 32 and 58 are energized. Referring to Fig. 9, one side of the disk 63 carries the cam segments 65 and 66. The edges of the cam segments extend a slight distance above the peripheral face of the disk 63 so as to engage and actuate a knife edge switch operating member to be described. Referring to Fig. 10, the other side of the disk 63 has the cam segments 67 and 68 secured to it, the outer edges of these segments extending a slight distance above the face of the disk 63 to actuate another knife edge switch operating member to be described. The cam segments 65, 66 and 67, 68 are independent pairs of cams and are located on opposite sides of a plane passing through the disk 63 transversely of the axis thereof. It will be noted that the cam segments 65 and 66 are spaced apart and that the segment 67 is located opposite one of the spaces between these segments and the cam segment 68 is located opposite the other space between these segments. The pair of cams 65, 66 controls the action of the direct feed solenoid 27 and the pair of cam segments 67, 68 controls the action of the reverse feed solenoid 32. It will be noted that by the arrangement of these cam segments the direct and reverse feed solenoids are alternately brought into operation. The shaft 18 runs somewhat slower than shaft 60, because while the work W is making one revolution to complete the weld, the timer T presents only that portion of its cam surface which keeps the re-direct or welding feed in action. The timer, in its cycle, provides time before and after the weld is completed for closing the circuit, drawing the arc, rupturing the arc, and for the removal of the finished work and insertion of new work. Consequently, the shaft 18 should rotate about 60% as fast as the shaft 60.

The pairs of segments 65, 66 and 67, 68 operate the switch levers 71 and 71', respectively, pivoted at 72 on the standard 73. In the path of each of the two pairs of cam segments there is a knife edge 74 carried by a plunger 75 which is normally pressed outwardly by a spring 76 bearing against a shoulder 751 on the plunger. The rear end of the plunger 75 engages against the end of a screw 77 by means of which the movement necessary to close the switch can be varied. The lower ends of the pivoted switch members 71, 71' carry contacts 711, 711' adapted to engage the contacts 712, 712' to close the circuits of the solenoids 27, 32. Springs 78 normally hold the switch members 71, 71' open and when the plunger 75 is forced to the left in Fig. 8 by a cam the switch member which it controls is swung on its pivot so that the switch contact which it carries moves against the opposite switch contact to close a solenoid circuit. As shown in Fig. 8, the contact 712 is pressed toward the contact 711 by a spring 713 which engages against a shoulder 714 on the contact 712. The current carrying contacts 711 and 712 are suitably insulated from the parts which support them. When the current contact 712 is pressed to the right against the spring 713 it engages a contact 715 to which one of the circuit wires is connected.

The cam 70 on the side of the disk 63 is designed to engage a knife edge 80 carried by a projection 641 on the stanchion 64. The knife edge 80 is secured in a slidable plunger 81 which moves in a cavity 82 in the stanchion part 641. The plunger 81 and the knife edge 80 are held in their extended position by a spring 811 and when the cam member 70 moves past the knife edge 80 the latter and the plunger to which it is connected are depressed, the end of the plunger engaging a fixed contact 83 to which the wire 84 is connected. The plunger 81 and the fixed contact 83 together with the parts carrying them are suitably insulated from other metal parts. Referring to Fig. 1, it will be noted that the wire 84 leads to one end of the winding of the solenoid 58, the other end of this solenoid winding being connected to a source of current such as the generator G by a wire 85. Thus when the cam 70 engages the knife edge 80 a circuit is established by the following path: Generator G, wire 10, work W, shaft 18, gears 62, 61, shaft 60, timer disk 63, cam 70, knife edge 80, wire 84, solenoid winding 58, wire 85 and back to the generator G. This energizes the solenoid 58 to render the wire cutter operative.

The operation of the machine is briefly as follows: Referring to Fig. 1 and Figs. 7 to 10 in particular, assuming that the end of the welding strip has just been severed and a new article has been inserted in the machine to be welded, the cycle of operation is as follows: The cam 65 of the timer T closes the circuit of the direct feed solenoid 27 at the contacts 711, 712 through the following path: Generator G, wire 10, work W, chuck 17, shaft 18, gears 62, 61, shaft 60, timer disk 63, cam 65, contact member 71, contacts 711, 712, wire 86, winding of solenoid 27, wire 87, wire 85 to generator G. This energizes the solenoid 27 and causes the welding strip S to be forced against the direct feed roll 25 for a time sufficient to allow that roll to feed the welding strip S until it comes in contact with the work W. This time is determined by the length of the cam 65. At the instant that the welding strip S engages the work W the cam 65 releases the knife edge which it was engaging and the circuit of the solenoid 27 is immediately opened at the contacts 711, 712. At practically the same instant that the latter contacts were opened the cam 67 engages the other knife edge which oscillates the switch lever 71' and the circuit of the reverse feed solenoid 32 is closed at the contacts 711' and 712', by the following path: Generator G, wire 10, work W, chuck 17, shaft 18, gears 62, 61, shaft 60, disk 63, cam 67, lever 71, contacts 711', 712', wire 88, winding of the solenoid 32, wire 89 to generator G through wire 85. By energizing the solenoid 32 the reverse feed roll 26 and the idler roll 36 grip the welding strip S and withdraw it from the work W for a sufficient distance to form the arc at $a$. The distance is determined by the length of the face of the cam 67. At the instant that the arc is formed the knife edge which was riding on the cam 67 passes off of this cam and the other knife edge which controls the action of the switch lever 71 rides onto the cam 66, which is called the welding cam. By this action the circuit of the direct solenoid 27 is again closed at the contacts 711, 712, as was the case when the cam 65 engaged the same knife edge, and the welding strip S is then continuously fed to the arc to maintain the arc which, in the meantime, is melting the welding strip. The molten metal is thus continuously deposited in the groove $g$ in the work during the welding period. It may require only one revolution of the work W to complete a weld or it may require a number of revolutions. The time required for the welding operation is determined and the length of the cam face 66 corresponds to this time. The gearing is so proportioned as to drive the timer, work and feeding mechanism in the right relation so that they will be exactly timed with respect to each other. When the weld is completed the knife edge riding on the face of the cam 66 reaches the end 661 of this cam and the direct feed solenoid 27 is then immediately deënergized by the opening of the contacts 711, 712. The reverse feed solenoid 32 is then again energized by the cam 68 engaging the knife edge formerly engaged by the cam 67. This closes the contacts 711′, 712′ and closes the circuit of the solenoid 32 for a sufficient period to permit the reverse feed roll 26 to draw the welding strip S away from the work W far enough to rupture the arc. When the arc has been ruptured the contacts 711′, 712′ are opened and both the solenoids 27 and 32 are deenergized for a sufficient period to permit the welded article or work to be removed and a new article set in its place.

During this period of removing the welded article and inserting a new article to be welded the end of the welding strip S is also cut off at a fixed point, as heretofore described, so that in the next cycle of operations the first forward feed of the welding strip S to close the welding circuit will correspond with the length of the cam 65. The cutter 40 is brought into action after the cam 68 passes its knife edge by the cam 70 engaging the knife edge 80 and closing the circuit of the solenoid 58. This causes the plunger 57 to be lifted and throws in the clutch member 50 at the proper instant to drive the cam 42 and force the cutter 40 across the lower end of the wire passage in the guide 14. The solenoid 58 is energized long enough to accomplish this cutting operation and is then immediately deenergized.

While I have described my invention in detail, it is to be understood that various changes may be made therein without departing from the principles involved and therefore I do not wish to be limited to the exact constructions illustrated.

Having thus described the invention, what is claimed and desired to be secured by Letters Patent is:

1. In a metallic electrode electric arc welding machine in which the metallic welding strip constitutes one of the electrodes and the work constitutes the other electrode, the combination of means for feeding the welding strip with respect to the work, and means for rendering said feeding means operative at a predetermined time in each cycle of operations of said machine.

2. In a metallic electrode electric arc welding machine in which the metallic welding strip constitutes one of the electrodes and the work constitutes the other electrode, the combination of a welding strip carrier, means for producing relative movement between the said carrier and the work, and independent means for simultaneously causing the welding strip to feed away from the work.

3. In an automatically acting metallic electrode electric arc welding machine in which the metallic welding strip constitutes one of the electrodes and the work constitutes the other electrode, the combination of a welding strip carrier means, for producing relative movement between the said carrier and the work, and automatic means for simultaneously causing the welding strip to feed away from the work.

4. In a metallic electrode electric arc welding machine in which a metallic welding strip constitutes one of the electrodes and the work constitutes the other electrode, the combination of means for feeding the welding strip to the work, and means operative at a predetermined time for reversing the direction of said feed to form the arc.

5. In a metallic electrode electric arc welding machine in which a metallic welding strip constitutes one of the electrodes and the work constitutes the other electrode, the combination of a welding strip carrier, means for producing relative movement between said carrier and the work, means for feeding the welding strip to the work, and means for reversing the direction of said feed to form the arc.

6. In a metallic electrode electric arc welding machine in which the metallic welding strip constitutes one of the electrodes and the work constitutes the other electrode, the combination of means for feeding the welding strip to the arc to maintain said arc and to supply welding material to be fused by the arc and deposited upon the work, and means for reversing the feed of the welding strip upon the completion of the weld to rupture the arc.

7. In a metallic electrode electric arc welding machine in which the metallic welding strip constitutes one of the electrodes and the work constitutes the other electrode, the combination of a welding strip carrier, means for producing relative movement between said carrier and said work, means for feeding the welding strip to the arc to maintain the arc and to supply welding material to be fused by the arc and deposited upon the work, and means for reversing the feed of the welding strip upon the completion of the weld to rupture the arc.

8. In a metallic electrode electric arc welding machine in which a metallic welding strip constitutes one of the electrodes and the work constitutes the other electrode, the combination of mechanism for feeding said welding strip, and means for maintaining said welding strip in a neutral or non-feeding position during a predetermined portion of the cycle of operation of the said machine.

9. In a metallic electrode electric arc welding machine in which a metallic welding strip constitutes one of the electrodes and the work constitutes the other electrode, the combination of a welding strip carrier, means for producing relative movement between said carrier and said work, mechanism for feeding said welding strip, and means for maintaining said welding strip in a neutral or non-feeding position during a predetermined portion of the cycle of operation of the said machine.

10. In a metallic electrode electric arc welding machine in which a metallic welding strip constitutes one of the electrodes and the work constitutes the other electrode, the combination of mechanism for feeding the welding strip, and means for rendering the feeding mechanism operative to alternately feed the welding strip in a direction toward the work and in a direction away from the work.

11. In a metallic electrode electric arc welding machine in which a metallic welding strip constitutes one of the electrodes and the work constitutes the other electrode, the combination of a welding strip carrier, means for producing relative movement between said carrier and said work, mechanism for feeding the welding strip, and automatic means for rendering the feeding mechanism operative to alternately feed the welding strip in a direction toward the work and in a direction away from the work.

12. In a metallic electrode electric arc welding machine in which a metallic welding strip constitutes one of the electrodes and the work constitutes the other electrode, the combination of means for feeding said welding strip, and means for cutting said welding strip.

13. In a metallic electrode electric arc welding machine in which a metallic welding strip constitutes one of the electrodes and the work constitutes the other electrode, the combination of a welding strip carrier, means for producing relative movement between said carrier and said work, means for feeding said welding strip, and means for cutting said welding strip at a predetermined and fixed distance from the welding point in order to remove that portion of the welding strip which has been subjected to the action of the arc leaving the welding strip the definte length necessary for forming the contact for the next succeeding weld.

14. In a metallic electrode electric arc welding machine in which a metallic welding strip constitutes one of the electrodes and the work constitutes the other electrode, the combination of a feeding means, and means for controlling the feeding means so as to cause it to first feed the welding strip to the work to close the circuit and start the flow of current, then to reverse the direction of feed to form the arc, then to feed the welding strip to the arc to maintain the arc and to supply welding material to be fused by the arc and deposited upon the work, then to reverse the direction of the feed and rupture the arc and continue feeding it in said reverse direction for a predetermined distance, and finally to cease feeding for a predetermined period.

15. In a metallic electrode electric arc welding machine in which a metallic welding strip constitutes one of the electrodes and the work constitutes the other electrode, the combination of a welding head and welding strip feeding means carried by the welding head comprising a direct feed roll, a reverse feed roll, and electro-magnetically operated means for forcing the welding strip against either one of said rolls to cause the welding strip to be fed toward the work or away from the work.

16. In a metallic electrode electric arc welding machine in which a metallic welding strip constitutes one of the electrodes and the work constitutes the other electrode, the combination of a welding head and welding strip feeding means carried by the welding head comprising a direct feed roll, a reverse feed roll, an idler opposite each of said feed rolls, said welding strip passing between said idlers and feed rolls, and electro-magnets for operating the said idlers to force the welding strip against the opposite roll to feed said welding strip toward or away from the work.

17. In a metallic electrode electric arc welding machine in which a metallic welding strip constitutes one of the electrodes and the work constitutes the other electrode, the combination of a welding head and welding strip feeding means carried by the welding head comprising a direct feed roll, a reverse feed roll, means for normally holding the welding strip away from said feed rolls, and means for forcing the welding strip against either one of the feed rolls to cause said strip to be fed toward or away from the work.

18. In a metallic electrode electric arc welding machine in which the work constitutes one of the electrodes and a metallic welding strip constitutes the other electrode, the combination of a welding circuit including a source of electric current, the work and the welding strip, means for feeding the welding strip toward and away from the work during the welding operation, means for moving the welding strip and work relatively to each other during the welding operation, and means for timing the action of said feeding means with respect to the action of said moving means.

19. In a metallic electrode electric arc welding machine in which the work constitutes one electrode and a metallic welding strip constitutes the other electrode, the combination of a welding circuit including a source of electric welding current, the work and the welding strip, a welding head, means on said welding head for feeding the welding strip toward and away from the work during the welding operation, electro-magnetic means on said welding head for controlling said feeding means, means for moving said welding head and work relatively to each other, and a timing device controlling the electro-magnetic means which controls the feeding means, said timing device being designed to properly time the operation of the feeding mechanism with the operation of the means for moving the welding head and work relatively to each other.

20. In a metallic electrode electric arc welding machine in which the work constitutes one of the electrodes and a metallic welding strip constitutes the other electrode, the combination of a welding circuit including a source of electric current, said welding strip and said work, a welding head, means for rotating the work, means on said welding head for feeding said welding strip toward and away from the work as the latter rotates, electromagnetic means on said head controlling the action of said feeding means, and a timer controlling the action of said electro-magnetic means and adapted to first cause the feeding means to move the welding strip toward the work to close the welding circuit, then to reverse the feed to move the welding strip away from the work to form the arc, then to feed the welding strip toward the work to maintain the arc and to supply welding material to be deposited on the work, then at the completion of the weld to feed the welding strip away from the work to rupture the arc, and finally to maintain the welding strip in a neutral or non-feeding position for an interval of time.

21. In a metallic electrode electric arc welding machine in which the work constitutes one of the electrodes and a metallic welding strip constitutes the other electrode, the combination with means for feeding said welding strip, of means for cutting said welding strip, and electro-magnetic means for controlling the action of said cutting means.

22. In a metallic electrode electric arc welding machine, in which the work constitutes one electrode and a metallic welding strip constitutes the other electrode, the combination of means for feeding said welding strip, electro-magnetic means for controlling said feeding means, means for cutting said welding strip, electro-magnetic means for controlling said cutting means, and means for controlling both of said electro-magnetic means to time the action of the cutting means with respect to the action of the feeding means.

23. In a metallic electrode electric arc welding machine in which the work constitutes one electrode and a metallic welding strip constitutes the other electrode, the combination of a welding head, driving means in the welding head, a direct feed roll driven by said driving means, a reverse feed roll geared to said direct feed roll, a cutter shaft adapted to be driven by said driving means, a cutter, a cam on said shaft for operating said cutter, electro-magnetically operable means for controlling the action of said direct and reverse feed rolls, and electro-magnetically operable means for controlling the action of said cutter shaft and cutter.

24. In a metallic electrode electric arc welding machine in which the work constitutes one electrode and a metallic welding strip constitutes the other electrode, the combination of means for feeding said welding strip, means for driving said feeding means continuously, normally inoperative means for cutting said welding strip, connections whereby said cutting means may be driven from said driving means, and means whereby said connections may be rendered operative to cause the operation of said cutting means.

25. In a metallic electrode electric arc welding machine in which the work constitutes one electrode and a metallic welding strip constitutes the other electrode, the combination with means for feeding said welding strip, of means for cutting said welding strip, operating means for said cutting means, driving means for said feeding means and for said operating means, and an electro-magnetic clutch for controlling the connection of said driving means to the cutter operating means.

26. In a metallic electrode electric arc welding machine in which the work constitutes one of the electrodes and a metallic welding strip constitutes the other electrode, the combination of a welding head comprising a panel provided with an opening, welding strip feeding means mounted on one side of said panel, a cutter passing through said opening in the panel, cutter operating means on the opposite side of said panel, and driving means for said feeding means and said cutter operating means.

27. In a metallic electrode electric arc welding machine in which the work constitutes one electrode and a metallic welding strip constitutes the other electrode, the combination of a welding head comprising a panel, welding strip feeding means mounted on the front side of said panel, a shaft extending through said panel from the rear to the front thereof for operating said feeding means, a cutter guided through said panel from the rear to the front thereof, normally inactive cutter operating means mounted on the rear side of said panel, driving means for said cutter operating means and for said shaft connected to the feeding means, and means for connecting said driving means to the cutter operating means so as to operate the cutter at a predetermined time.

28. In a metallic electrode electric arc welding machine, in which the work constitutes one electrode and a metallic welding strip constitutes the other electrode, the combination of a welding head comprising a panel, welding strip feeding means mounted on the front side of said panel, said feeding means comprising a direct feed roll, a reverse feed roll geared to said direct feed roll, an idler roll opposed to each feed roll and spaced therefrom to permit the welding strip to pass therebetween, electro-magnetic means for moving either one of said idler rolls toward the feed roll opposed to it to cause the direct or reverse feed of said welding strip, a shaft carrying said direct feed roll and extending through said panel to the rear side thereof, a welding strip guide on the front side of said panel, a cutter movable transversely of the opening in said guide and extending through said panel to the rear side thereof, a spring bearing against the rear side of said panel and adapted to normally hold said cutter away from the opening in said guide, cutter operating means mounted on the rear side of said panel and comprising a vertical shaft, a cam adapted to reciprocate said cutter, means for mechanically connecting said cam to said vertical shaft, a driving means at the rear of said panel, means for connecting said driving means to said feed roll operating shaft so as to continuously rotate said feed rolls in opposite directions, and means for connecting said driving means to said vertical shaft at predetermined intervals comprising a clutch on said shaft, and an electro-magnet mounted on the rear side of said panel and adapted to operate said clutch.

29. In a metallic electrode electric arc welding machine, the combination of a timer comprising a rotatable disk, cam segments on said rotatable disk, and contactors controlled by said cam segments, and electrode feeding mechanism controlled by said timer and comprising solenoids in circuit with said contactors.

30. In a metallic electrode electric arc welding machine, a timer comprising two independent switch members, a rotatable disk, two independent sets of cams carried by said disk, one of said sets of cams operating one of said switches and the other cam operating the other switch, the two sets of cams together constituting the equivalent of a complete cycle of operations for the welding strip feeding means of the welding machine.

31. In a metallic electrode electric arc welding machine in which the work constitutes one electrode and a metallic welding strip constitutes the other electrode, a timing device for controlling the action of the welding strip feeding means of said machine, said timing device comprising a rotatable disk, two sets of cams on said disk, one set on each side of a plane extending transversely through the disk and the axis thereof, one set of cams on said disk controlling the direct feed of the welding strip toward the work and the other set of cams controlling the reverse feed of the welding strip away from the work, the cams of the two sets alternating so that the welding strip will be alternately fed toward and away from the work.

32. In a metallic electrode electric arc welding machine in which the work constitutes one electrode and a metallic welding strip constitutes the other electrode, a timing device for controlling the action of the welding strip feeding means of said machine, said timing device comprising a rotatable disk, two sets of cams on said disk, one set on each side of a plane extending transversely through the disk and the axis thereof, one set of cams on said disk controlling the direct feed of the welding strip toward the work and the other set of cams controlling the reverse feed of the welding strip away from the work, the cams of the two sets alternating so that the welding strip will be alternately fed toward and away from the work, and an additional cam on said disk for actuating a welding strip cutting mechanism at the proper time in the cycle of a welding operation.

33. In a metallic electrode electric arc welding machine in which the work constitutes one electrode and a metallic welding strip constitutes the other electrode, the combination of means for feeding the welding strip toward and away from the work, means for cutting the welding strip, and a timing device for timing the feed of the welding strip toward and away from the work with the cutting of the strip, said device comprising two pivotally mounted independent switches for controlling the feed of said welding strip toward and away from the work, two independent sets of cams for actuating said switches at the proper instant to control the direct and reverse feed, and an additional cam for controlling the action of said cutting means.

34. In a metallic electrode electric arc welding machine in which a metallic welding strip constitutes one of the electrodes and the work constitutes the other electrode, the combination of a welding head carrying the welding strip, means for moving said head and work relatively to each other, means for feeding the welding strip from said head to said work during said relative movement, and automatically acting means for rendering said feeding means operative and inoperative at predetermined times in the successive cycles of operation of the machine.

In testimony whereof I affix my signature.

HARRY D. MORTON.